United States Patent [19]

Kubota

[11] Patent Number: 4,958,237

[45] Date of Patent: Sep. 18, 1990

[54] METHOD OF MAKING ENLARGED PRINTS BY SUBDIVIDING AN ORIGINAL IMAGE AND INTERPOLATING THE SUBDIVIDED IMAGE

[75] Inventor: Kazufumi Kubota, Kanagawa, Japan

[73] Assignee: Fuji Photo Film Co., Ltd., Kanagawa, Japan

[21] Appl. No.: 269,086

[22] Filed: Nov. 9, 1988

[30] Foreign Application Priority Data

Nov. 9, 1987 [JP] Japan .................................. 62-282515

[51] Int. Cl.⁵ .......................................... H04M 1/393
[52] U.S. Cl. ....................................... 358/451; 358/77
[58] Field of Search ...................... 358/77, 451; 382/47

[56] References Cited

U.S. PATENT DOCUMENTS 4,468,693  8/1984  Fujita et al. ............................ 358/75
4,547,786  10/1985  Logan et al. ........................... 358/77
4,679,074  7/1987  Sugiura et al. ......................... 358/75

Primary Examiner—Edward L. Coles, Sr.
Attorney, Agent, or Firm—Sughrue, Mion, Zinn, Macpeak & Seas

[57] ABSTRACT

A method of making a large size print from an original by dividing an image of an original into smaller divisions in the form of a matrix is provided. Video signals of the original image are read from divided memory areas of a memory, respectively. The information in each of the smaller divisions are enlarged by interpolating the video signals read out from each divided memory area. The interpolated video signals of each smaller division are displayed on an image display device such as CRT and projected onto a photographic paper for exposure, thereby making enlarged prints of the smaller divisions which in turn are arranged to form an enlarged picture of the original.

15 Claims, 4 Drawing Sheets

METHOD OF MAKING ENLARGED PRINTS BY SUBDIVIDING AN ORIGINAL IMAGE AND INTERPOLATING THE SUBDIVIDED IMAGE

BACKGROUND OF THE INVENTION

1. Field of the Invention

The present invention relates to a method of making an enlarged print by the use of a video printer.

2. Description of the Prior Art

Various video printers for making a hard copy or a print of a video image, such as CRT color video printers, laser printers, ink-jet printers and so on are well known. Such video printers print out a hard copy of a video image after electrically processing video signals.

At the same time, the video printer must have a high degree of magnification in order to make large sizes of pictures or posters from originals such as color negatives. Video printers having a degree of high magnification are relatively large in size and costly. In addition, because the standardized color papers that are now available are limited in size, print sizes are accordingly limited and it is therefore difficult to make large sizes of pictures or posters using a conventional video printer.

SUMMARY OF THE INVENTION

It is, therefore, an object of the present invention to provide a method of making large size prints at a low cost and with ease.

For achieving the above object, the present invention provides a method of making a large size print from an original by performing a step of dividing an image of an original into a matrix of smaller divisions by reading video signals of the image of the original from divided memory areas of a memory. respectively. Then the step is performed of enlarging each image of the smaller divisions by interpolating the video signals read out from each divided memory area. The interpolated video signals of each image of the smaller divisions are displayed on an image display device such as a CRT. Such displayed image is projected onto photographic paper for exposure, thus making enlarged prints of the smaller divisions which in turn are arranged to form an enlarged picture of the original.

According to a preferred embodiment of the present invention, the enlarged images are printed on a roll of photographic paper either by line or column of the matrix. The printed photographic paper is cut into print strips. Each print strip includes a series of images of a line or a column of divisions, and are arranged, for example, on a display panel to form a large print of the original.

BRIEF DESCRIPTION OF THE DRAWINGS

The description refers to the accompanying drawings in which.

DETAILED DESCRIPTION OF THE INVENTION

Figure 1:
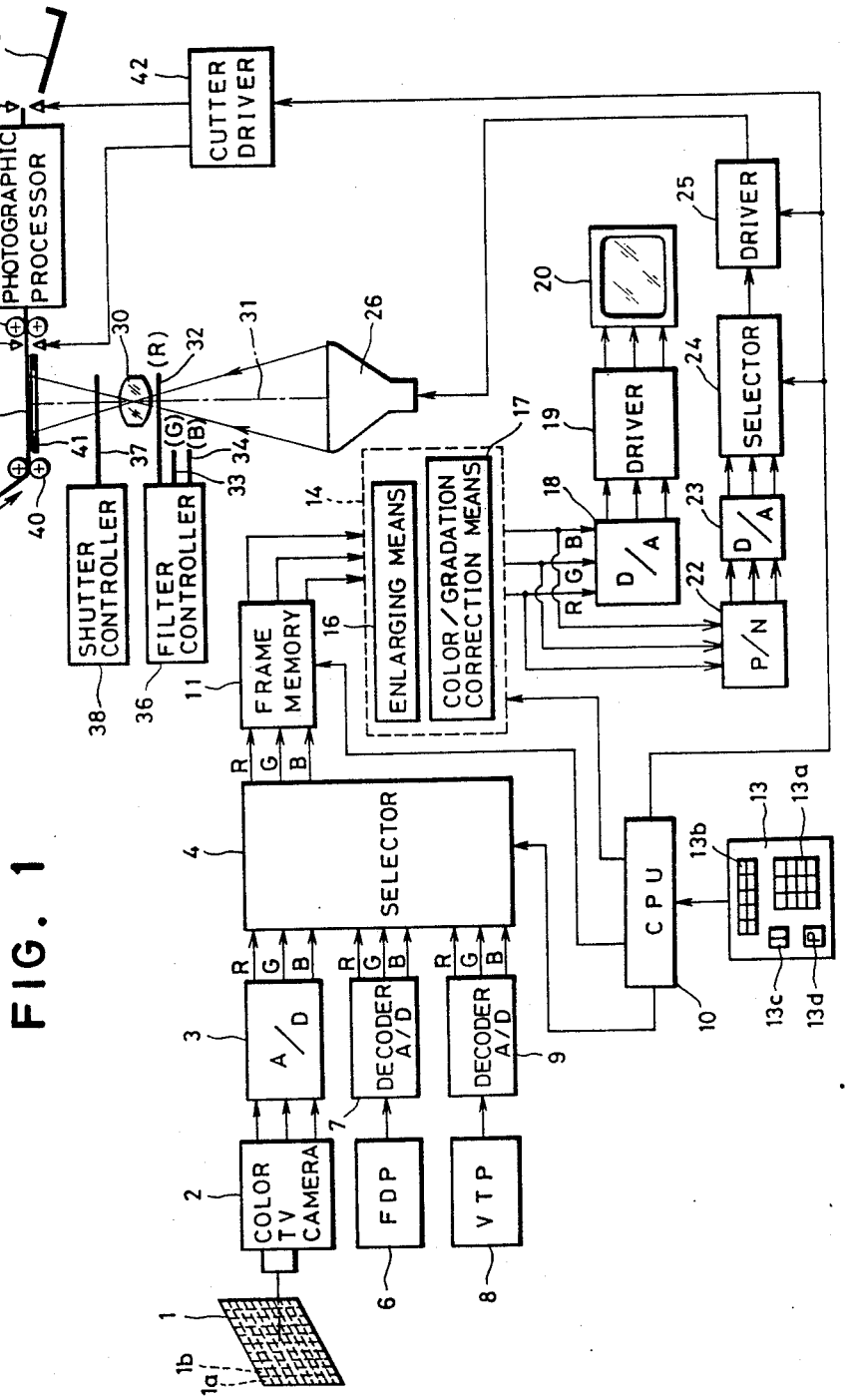
FIG. 1 is a block diagram of a CRT video printer in which the method of making an enlarged print according to a preferred embodiment of the present invention is shown.

Referring now to FIG. 1, shown therein is the CRT video printer which performs the method of making an enlarged print according to a preferred embodiment of the present invention. As shown, the CRT color video printer includes a color TV camera 2 as image input means to take an image of a color original 1 such as color negative films, color positive films o the like from which an enlarged print is to be made. The color TV camera provides color video signals of three color images of the color original 1 separately for red, green and blue. An analog-to-digital converter 3 is connected to the color TV camera 2 to convert the three color video signals from an analog form to a digital form. The digital video signals of the color original 1 are then sent to selector 4. In addition to the color TV camera 2, other image input means such as a floppy disk player 6 and a video tape player 8 are provided. The players 6 and 8 provide three color video signals separately to the selector 4. It is noted that the color TV camera 2 may be replaced with an optical color scanner which is well known in the art.

The selector 4 is controlled by a controller 10 mainly comprising a central processing unit (CPU) to select any one of the image input means, namely the color TV camera 2, the floppy disk player (FDP) 6 or the video tape player (VTP) 8 in order to retrieve three color video signals R. G and B and send them to a frame memory 11 by color. The frame memory 11 comprises three memory sections for storing the three color video signals. respectively.

The memory area of the frame memory 11 is divided by the controller 10 into any number, for example 10×10, of divisional memory areas for divisions into which the color original 1 is notionally divided. To divide the frame memory 11, an instruction is entered into the controller 11 through ten keys 13a of a keyboard 13. The three color video signals in the memory 11 can be read out by division and by color in a well known way. The keyboard 13 is further provided various keys 13b, 13c and 13d for color and gradation corrections. video signal input instruction and printing instruction, respectively, as well as the ten keys 13a.

The video signals thus read out are sent to an image processing section 14 comprising enlarging means 16 for electrically interpolating the video signals in order to enlarge an image of each picture element of the color original and correcting means 17 for effecting color and gradation corrections. Due to the interpolation of video signals, an image of each picture element of the color original can be enlarged with neither mosaic pattern nor inferior resolution. The correcting means 17 further corrects for the difference between the spectral sensitivity of color paper and the spectral transmittance of an image pick up system of the color TV camera 2. The color video signals, after having been processed in the image processing section 14, are sent to both a monitoring system and a printing system.

The monitoring system includes a D/A converter 18. a CRT driver 19 and a color CRT monitor 20 on which an image intended to be printed is displayed for visible observation. The printing system includes a positive-to-negative reversal circuit 22, a D/A converter 23, a selector 24, a CRT driver 25 and a printing black-and-white CRT 26. After digital-to-analog conversion, any one of the three colors of analog video signals are selected by the selector 24 to be displayed, as a black-and-white negative image in the form of a brightness pattern on the black-and-white CRT 26 through the CRT driver 25. In such a manner, three black-and-white negative images for red, green and blue are displayed sequentially.

Facing the black-and-white CRT 26, there is displayed a photographic recording material such as a color photographic paper 29 onto which the black-and-white video images on the black-and-white CRT are projected by a printing lens 30 through color filters in multiple exposure. In a printing path 31 defined by the printing lens 30, there are three color filters. namely a red filter (R) 32, a green filter (G) 33 and a blue filter (B) 34. A filter controller 18 inserts the three color filters 32 to 34 into the printing path 31 independently of the other two but in sequence for additive printing in three color frame sequence exposure. Between the printing lens 30 and the color photographic paper 29, there is a shutter 37 controlled by a shutter controller 38 to open and close once for each color. namely three times for one image displayed on the black-and-white CRT 26.

The color photographic paper 29 in the form of a roll is intermittently withdrawn by a pair of withdrawing rollers 40 frame-by-frame and placed in an exposure position defined by a framing mask 41. The color photographic paper 29, after exposures of a line or a column of the matrix or a predetermined number of divisions of the color original is cut by a cutter 43 to print strips each of which in turn is transported into a photographic processor 45 by means of a pair of transporting rollers 44. In the photographic processor 45, each print strip of exposed color photographic paper 29 is processed in a well known manner. A cutter 47 actuated by a cutter driver 42 controlled by the controller 10 is provided to cut, if necessary. the print strip into individual prints. The print strips or the individual prints, are delivered into a tray 46.

Figure 2:
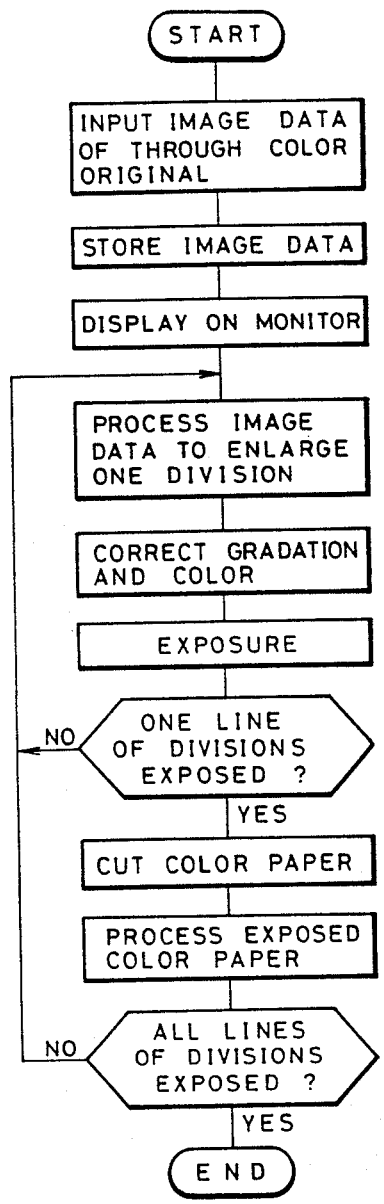
FIG. 2 is a flow chart showing a sequence of making an enlarged print from a line of divisions of an original.

The operation of the CRT color video printer thus constructed will be described with reference to FIG. 2 which is a flow chart illustrating a sequence of making an enlarged print. Instructions are entered through the ten keys 13a of the keyboard 13 to determine the number of divisions to which the color original 1 is notionally divided. After the determination of the number of divisions, the controller 10 automatically determines the magnification of an image of each division of the color original to be displayed on the printing CRT 26. Thereafter, an instruction for inputting video signals of the color original 1 is entered into the controller 10 through the key 13c of the keyboard 13. The controller 10 causes the color TV camera to pick up an image of the color original 1 to separately send three color video signals to the A/D converter 3. The three color video signals converted into a digital form are selectively transmitted to the frame memory 11 by color by the selector 4, to be stored in each divisional memory area of the frame memory 11 by color. It is understood that video signals of an image recorded in a floppy disk or a video tape can be provided by driving the FDP 6 or the VTP 8 and are sent to the selector 4.

The video signals in the frame memory 11 are repeatedly read out and sent to the image processing section 14. When an image of the color original 1 is monitored on the CRT monitor 20, the image processing section 14 transmits the video signals to the correcting means 17 without subjecting the video signals to interpolation for enlarging the image of the color original 1. Thus, an image normally corrected for color and gradation is displayed on the monitor CRT 20 through the CRT driver 19.

The image on the monitor CRT 20 is visually observed to correct color and gradation by entering instructions through the correction keys 13b of the keyboard 13 if desired. According to the instructions color correction data and/or gradation correction data are changed to display an image with corrected color and gradation. These corrections will be made repeatedly until a desired image is displayed on the monitor CRT 20. At this time, it may be preferred to make a trial print. For such a trial print. a negative image is displayed on the printing CRT 26 without being enlarged. This trial print can save the color photographic paper.

When the image displayed on the monitor CRT 20 has been desirably corrected as a result of visual observation, an instruction is entered through the printing key 13d to print the video image. The controller 10 reads the frame memory 11 to provide video signals of divisions of the first line of the color original notionally divided into a matrix for red, green and blue and sends them to the image processing section 14. That is. the video signals of the first division 1a of the first line of the color original 1 are sent first to the image processing section 14 for interpolation and color and gradation correction. At this time, the video signals are corrected with the data set during monitoring.

The video signals thus processed are sent first to positive-to-negative converter 22 and then to the D/A converter 23 for digital-to-analog conversion. The color analog video signals are selectively transmitted by the selector 24 to the driver 25 by color. The red analog video signals are for example selected first and then sent to the CRT driver 25. The black-and-white CRT 26 is driven by the CRT driver 25 to display thereon the red video signals as a black-and-white image in the form of a brightness pattern. While the black-and-white CRT 26 is being excited, the red filter 32 is inserted into the printing path 31 to translate the black-and-white image to a red image. Then, the shutter 37 is opened for an exposure time which is determined based on the light sensitivity of the color photographic paper 29 to red, to project the red image onto the color photographic paper 11 through the printing lens 30, thereby forming a latent image on the photographic paper 29.

After the exposure of red image, the shutter 37 is closed to allow for the replacement of the red filter 32 with the green filter 33 in the printing path 31. Immediately after, the green video signals are selected and sent to the CRT driver 25. The black-and-white CRT 26 is driven by the CRT driver 25 to display thereon the green video signals as a black-and-white image in the form of a brightness pattern. While the black-and-white CRT 26 is being excited, the shutter 37 is again opened to project a green image onto the color photographic paper 29 through the printing lens 30, thereby forming a green latent image over the red latent image on the color photographic paper 29.

Figure 5:
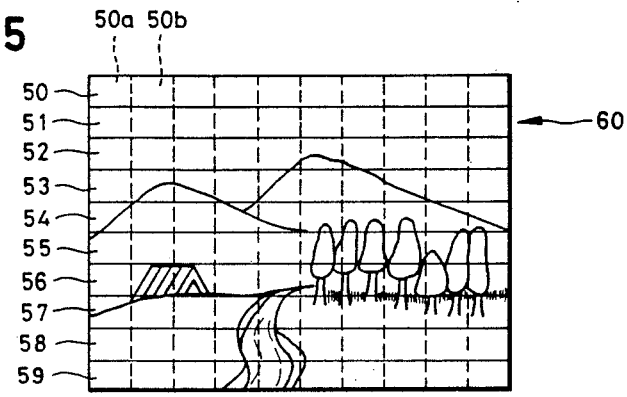
FIG. 5 is an explanatory illustration showing an enlarged print of an original made by the sequence of FIG. 2.

In the same way as for the red and green images, the green filter 33 is replaced with the blue filter 34 simultaneously with displaying a black-and-white image in the form of a brightness pattern of the blue image on the black-and-white CRT 26. Thereafter the shutter 37 is opened again to form a blue latent image over the red and green images on the color photographic paper 29. In such a manner, the division 1a of the color original 1 is printed as a first enlarged image frame 50a on the color photographic paper 29 as is shown in FIG. 5 in a three color frame sequence exposure.

Thereafter, the second division 1b of the first line of the color original 1 is printed as a second enlarged image frame 50b next to the image frame 50a on the color photographic paper 29 in the same manner as for the first image frame 50a. When all divisions of the first line of the color original 1 are printed on the color photographic paper 29, the cutter driver 42 is actuated to cause the cutter 43 to cut the color photographic paper 29 into an undeveloped print strip 50 formed with enlarged latent images of all the divisions of the first line of the color original 1. This print strip 50 is developed in the photographic processor 45 to form a series of enlarged visible images of all the divisions on the first line of the color original 1. and thereafter delivered to the tray 46.

In just the same manner, all divisions of the other lines of the color original 1 are enlarged and successively printed on the color photographic paper 29 in a series cut into individual print strips 51 through 59. The print strips 50 through 59 thus provided are arranged on and fixed to, for example, a display panel to form an enlarged picture 60 analogous to the color original 1 as is shown in FIG. 5. In FIG. 5. a broken line is depicted to show notional divisions of the enlarged picture corresponding to the divisions of the color original 1. Because the enlarged picture 60, in this embodiment, is divided into ten lines each of which comprises ten divisions it is as large as 100 times of a picture made in an ordinary CRT printing method. As a result of the printing method according to the present invention, a picture is enlarged by electrically interpolating video signals, and thus prevents deterioration of image quality.

Figure 3:
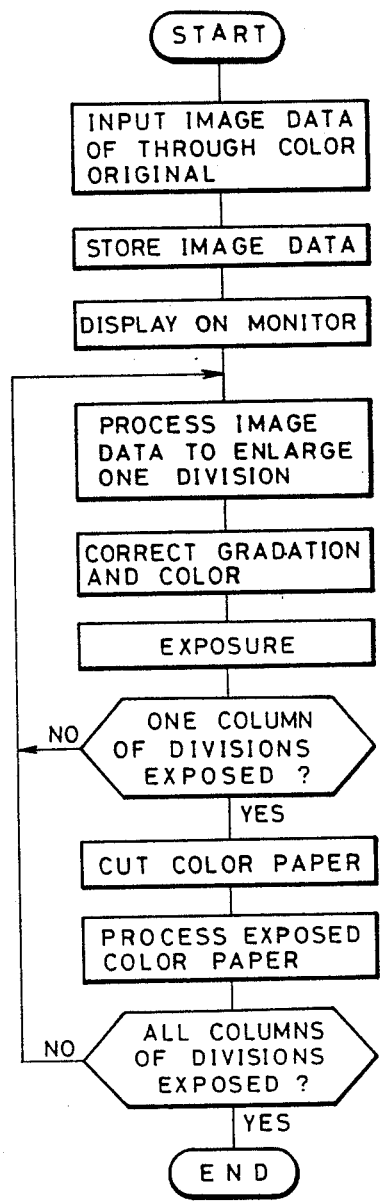
FIG. 3 is a flow chart showing a sequence of making an enlarged print from a line of divisions of an original.
Figure 6:
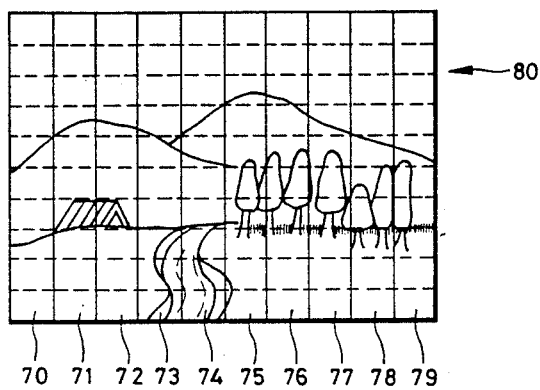
FIG. 6 is an explanatory illustration showing an enlarged print of an original made by the sequence of FIG. 3.

Instead of providing each print strip including enlarged images of divisions of each line of the color original 1, it is permissible to provide print strips according to a flow chart shown in FIG. 3. According to the sequence each print strip includes enlarged images of divisions of each column of the color original 1. As is shown in FIG. 6, the print strips 70 to 79 are made and arranged side-by-side on a display panel to form a large size of printed picture 80 of the color original 1. It is to be noted that an image of each division of the color original 1 is turned through a right angle on the black-and-white printing CRT 29.

Figure 4:
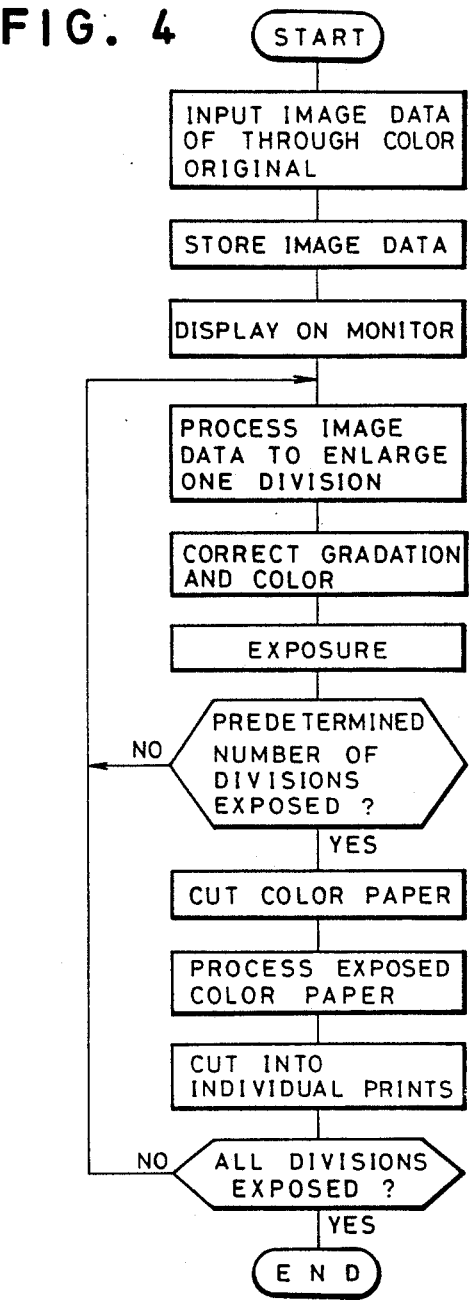
FIG. 4 is a flow chart showing a sequence of making an enlarged print from a column of divisions of an original.
Figure 7:
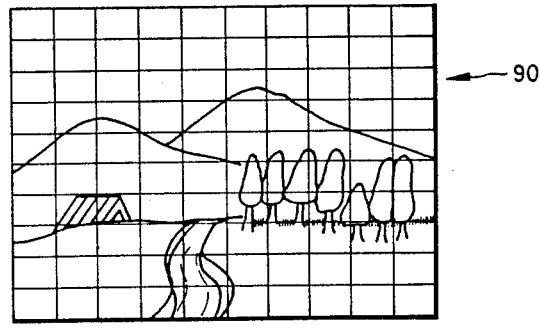
FIG. 7 is an explanatory illustration showing an enlarged print of an original made by the sequence of FIG. 4.

It is further permissible to provide an enlarged print of each division of the color original 1 according to still another sequence shown in FIG. 4. In this case, each print strip including enlarged image of divisions either of each line or each column of the color original 1 is cut into individual prints by means of the cutter 47 driven by the cutter driver 42 controlled by the controller 10. The individual prints are arranged to form a large size of printed picture 90 of the color original 1 as is shown in FIG. 7. It is desirable to print a line number and/or a division number on the back of each print to make it easy to arrange it at its right location.

It is noted that various printers such as ink-jet printers may be used to make hard copies in place of the CRT video printer.

The present invention has been shown and described with reference to specific embodiments. However, it should be noted that the invention is in no way limited to the details of the illustrated embodiments, and changes and modifications may be made without departing from the scope of the appended claims.

What is claimed is:

1. A method of making a large size of print, comprising the steps of:
    storing video signals of an image of an original in memory areas of a memory, wherein said memory areas correspond to a matrix of smaller divisions of said original;
    dividing said image of said original into said smaller divisions by reading said video signals from said memory areas of said memory, respectively;
    processing said video signals read out from each of said memory areas for enlargement;
    making a hard copy of an enlarged image of each of said smaller divisions of said original in response to said processed video signals; and
    arranging said hard copies of said enlarged images of all said smaller divisions of said original to thereby form a large print of said original.

2. A method as defined in claim 1, wherein said processing step comprises interpolating said video signals in each of said smaller divisions for enlargement.

3. A method as defined in claim 1, wherein said video signals are provided by a TV camera.

4. A method of making a large size of print, comprising the steps of:
    storing video signals of an image of an original in memory areas of a memory, wherein said memory areas correspond to a matrix of smaller divisions of said original;

5. A method as defined in claim 4, wherein said hard copy is made through an exposure means for exposing said enlarged image displayed on an image display device onto said photographic paper material.

6. A method as defined in claim 5, wherein said image display device comprises a CRT.

7. A method as defined in claim 6, wherein said CRT is a black-and-white CRT.

8. A method as defined in claim 7, wherein said hard copy is made by performing the steps of:
    successively displaying brightness patterns on said black-and-white CRT for red, green and blue images in response to said processed video signals;
    successively inserting red, green and blue filters between said black-and-white CRT and said photographic paper material, said red, green and blue filters being inserted according to which of said red, green and blue images is displayed; and
    opening and closing a shutter for each of said red, green and blue images.

9. A method as defined in claim 8, wherein the length of time said shutter is opened for each of said red, green and blue images depends on the light sensitivity of said photographic paper material to red, green and blue light.

10. A method as defined in claim 5, wherein said hard copy is made by performing the steps of:

successively displaying brightness patterns on a black-and-white CRT for red, green and blue images in response to said processed video signals;

successively inserting red, green and blue filters between said black-and-white CRT and said photographic paper material, said red, green and blue filters being inserted according to which of said red, green and blue images is displayed; and opening and closing a shutter for each of said red, green and blue images.

11. A method as defined in claim 10, wherein the length of time said shutter is opened for each of said red, green and blue images depends on the light sensitivity of said photographic paper material to red, green and blue light.

12. A method of making a large size of print, comprising the steps of:

storing video signals of an image of an original in memory areas of a memory, wherein said memory areas correspond to a matrix of smaller divisions of said original;

dividing said image of said original into said smaller divisions by reading said video signals from said memory areas of said memory, respectively;

processing said video signals read out from each of said memory areas for enlargement;

making a hard copy of an enlarged image of each of said smaller divisions of said original in response to said processed video signals; and arranging said hard copies of said enlarged images of all said smaller divisions of said original to thereby form a large print of said original, wherein said making step comprises printing said enlarged image of each of said smaller divisions on a photographic paper material.

13. A method as defined in claim 12, wherein said hard copy is made through an exposure means for exposing said enlarged image displayed on an image display device onto said photographic paper material.

14. A method as defined in claim 13, wherein said image display device includes a CRT.

15. A method as defined in claim 14, wherein said CRT is a black-and-white CRT.

* * * * *